US012394283B1

(12) United States Patent
Mattison et al.

(10) Patent No.: US 12,394,283 B1
(45) Date of Patent: Aug. 19, 2025

(54) GENERATIVE ARTIFICAL INTELLIGENCE-BASED AUTOMATED TELLER MACHINE OPERATION CONTROL

(71) Applicant: Bank of America Corporation, Charlotte, NC (US)

(72) Inventors: Paul Mattison, Charlotte, NC (US); Matthew Williams, Plano, TX (US); Jennifer Raley, Mount Holly, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/654,188

(22) Filed: May 3, 2024

(51) Int. Cl.
*G07F 19/00* (2006.01)

(52) U.S. Cl.
CPC .......... *G07F 19/209* (2013.01); *G07F 19/206* (2013.01)

(58) Field of Classification Search
CPC ....... G07F 19/20; G07F 19/206; G07F 19/209
See application file for complete search history.

(56) References Cited

U.S. PATENT DOCUMENTS 10,380,788 B2 8/2019 Martinez
10,789,755 B2 9/2020 Amer et al.
11,042,800 B2 6/2021 Mars et al.
11,164,581 B2 11/2021 Chae et al.
11,429,712 B2 8/2022 Ortiz et al.
11,521,273 B2 12/2022 Jakka et al.
2019/0033849 A1 1/2019 Cella et al.
2019/0095775 A1 3/2019 Lembersky et al.

OTHER PUBLICATIONS

Nov. 22, 2014—(US) Non-Final Office Action—U.S. Appl. No. 18/654,126.
Mar. 13, 2025—(US) Notice of Allowance—U.S. Appl. No. 18/654,126.

*Primary Examiner* — Laura A Gudorf
(74) *Attorney, Agent, or Firm* — Banner & Witcoff, Ltd.

(57) ABSTRACT

Arrangements for using generative artificial intelligence models for ATM operations control are provided. In some examples, a computing platform may receive, from a plurality of ATMs, operation data. The operation data may be analyzed using a first generative artificial intelligence (AI) model to identify one or more potential issues. If an issue is identified, additional data related to the issue may be retrieved from an impacted ATM. A second generative AI model associated with the particular identified issue may be identified. The model may be executed using the additional data as inputs to identify or output a corrective action. The corrective action may be transmitted to the ATM for execution. The one or more generative AI models may be updated to continuously improve accuracy.

18 Claims, 8 Drawing Sheets

GENERATIVE ARTIFICAL INTELLIGENCE-BASED AUTOMATED TELLER MACHINE OPERATION CONTROL

BACKGROUND

Aspects of the disclosure relate to electrical computers, systems, and devices for artificial intelligence-based automated teller machine (ATM) operations control.

Currently, large networks of ATMs are managed by generally manual processes in which issues are addressed only when failure of the ATM or of a particular functionality of the ATM is detected. At this point, a user may be dispatched to identify the issue, correct the issue and return the ATM to service. These arrangements can be time consuming and may be inefficient. Further, these arrangements only focus on one particular issue and do not evaluate or identify other potential issues or impacts of a current issue on other aspects of the ATM, a network or other systems. Accordingly, it would be advantageous to have a robust monitoring system that uses generative artificial intelligence to monitor and control ATM operations.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated using accurately and efficiently controlling ATM operations.

In some examples, a computing platform may receive, from a plurality of ATMs, operation data. The operation data may be analyzed using a first generative artificial intelligence (AI) model to identify one or more potential issues. If an issue is identified, additional data related to the issue may be retrieved from an impacted ATM. A second generative AI model associated with the particular identified issue may be identified. The model may be executed using the additional data as inputs to identify or output a corrective action. The corrective action may be transmitted to the ATM for execution. The one or more generative AI models may be updated to continuously improve accuracy.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed herein, ATM operations are often loosely monitored until an issue of sufficient severity is detected to dispatch assistance. Accordingly, a more robust system for monitoring and controlling ATM operations would be advantageous.

Aspects described herein provide for a first generative AI model to analyze ATM operation data from a plurality of ATMs to detect anomalies or potential issues. Upon detection of an issue, a second generative AI model, selected from a plurality of generative AI models, each associated with different issues, may be identified and executed to identify a cause of the detected issue and corrective action. The corrective action may be transmitted or sent to the ATM for execution and correction of the potential issue.

These and various other arrangements will be discussed more fully below.

Figure 1A:
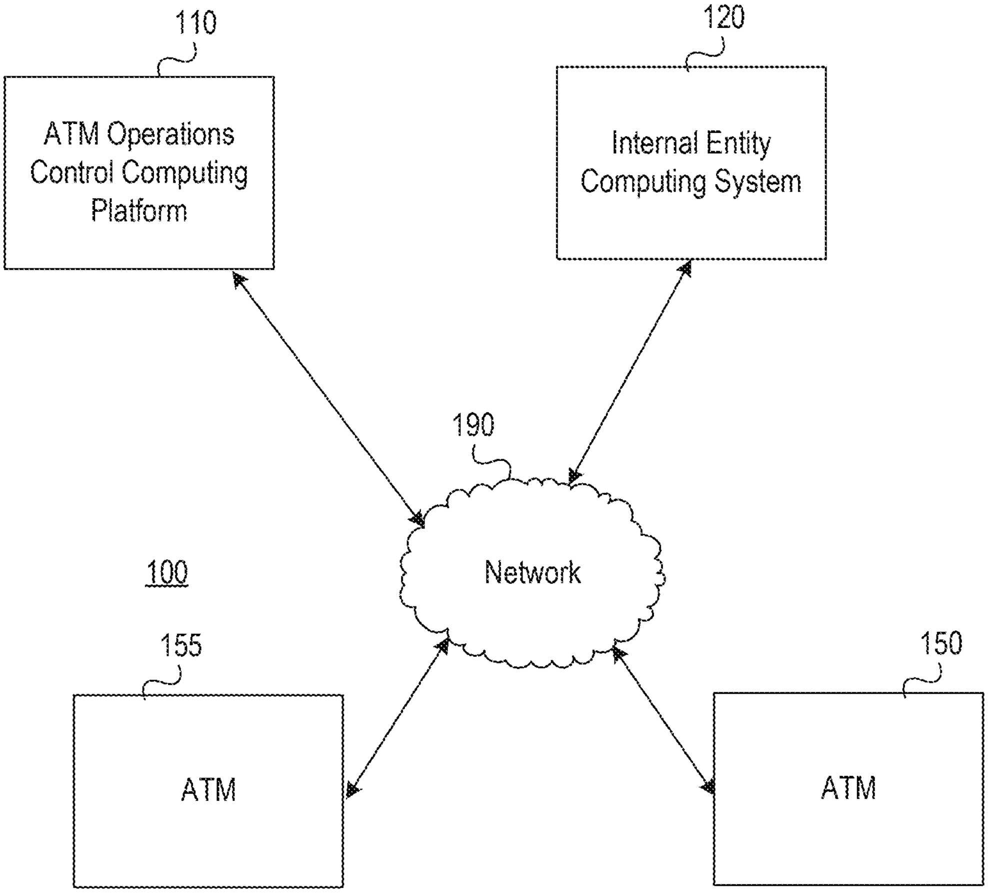
FIGS. 1A-1B depict an illustrative computing environment for using generative artificial intelligence models to control ATM operations in accordance with one or more aspects described herein.
Figure 1B:
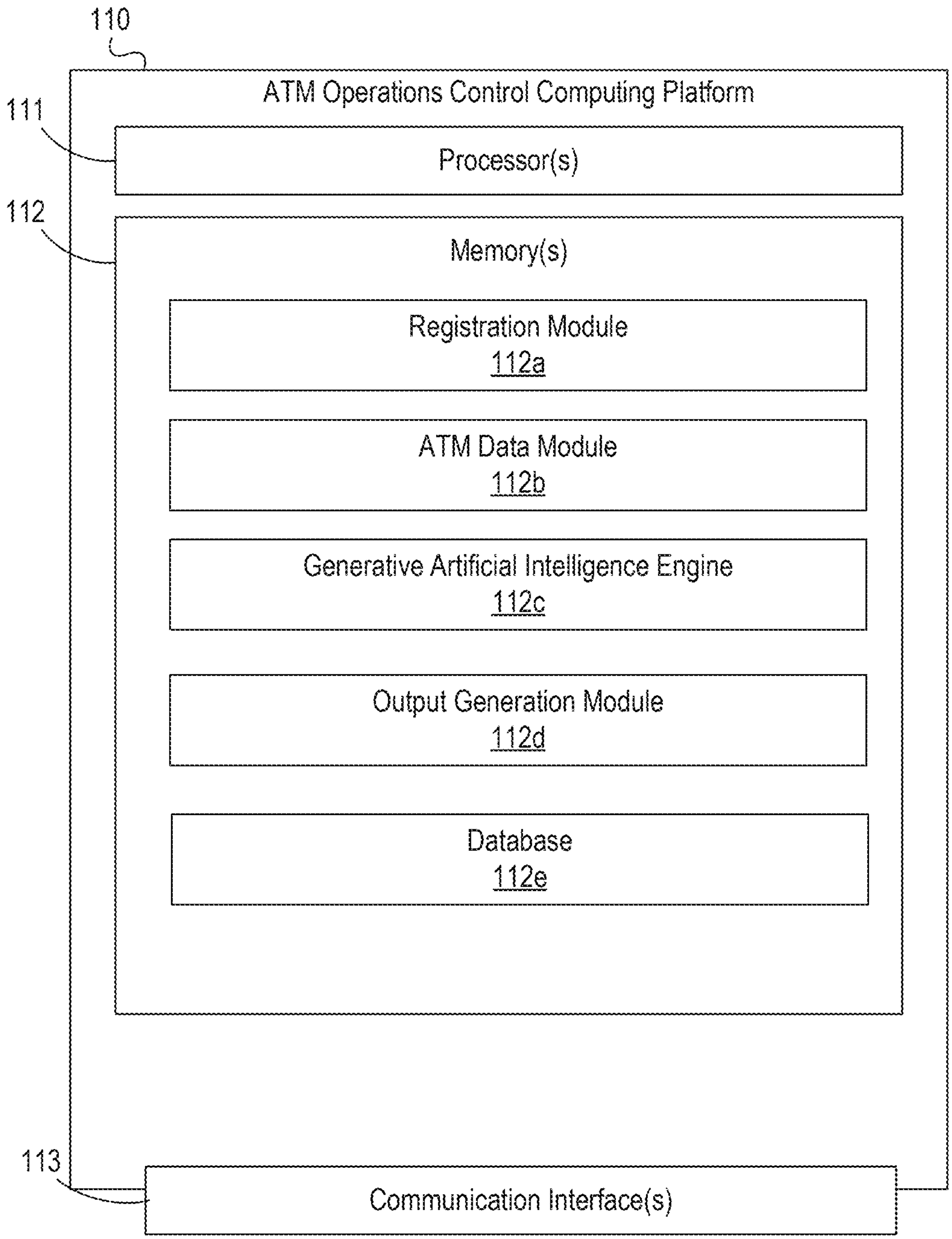

FIGS. 1A-1B depict an illustrative computing environment for using generative artificial intelligence control automated teller machine (ATM) operations in accordance with one or more aspects described herein. Referring to FIG. 1A, computing environment 100 may include one or more computing devices and/or other computing systems. For example, computing environment 100 may include ATM operations control computing platform 110, internal entity computing system 120, ATM 150 and ATM 155. Although one internal entity computing system 120 and two ATMs 150. 155 are shown, any number of devices or systems may be used without departing from the invention.

ATM operations control computing platform 110 may be or include one or more computing devices (e.g., servers, server blades, or the like) and/or one or more computing components (e.g., memory, processor, and the like) and may be configured to provide dynamic, efficient, intelligent ATM operations control. For instance, ATM operations control computing platform 110 may receive data related to operations of a plurality of ATMs 150, 155. In some examples, the ATM operations control computing platform 110 may receive data from all ATMs within a network (e.g., a network of ATMs owned or operated by a financial institution or other enterprise organization). In some examples, data may be received from ATMs outside the network but being operated by or otherwise associated with the enterprise organization.

In some arrangements, the data may include operations data associated with each ATM. For instance, the data received may include data related to performance of various hardware components of the ATM (e.g., whether a card reader, deposit/withdrawal slot, storage cartridges or the like are operating as expected), data related to performance of software associated with the ATM (e.g., whether all functionality is available, whether user interfaces are displaying as expected, and the like), data related to funds availability, availability of denominations of funds, maintenance data, replenishment data, and the like. In some examples, the data may be received and processed in real-time or near real-time.

In some examples, ATM operations control computing platform 110 may receive the data and input the data to a first generative artificial intelligence (AI) model. In some examples, the first generative artificial intelligence model may be trained using historical ATM operations data to evaluate the current data to detect any anomalies or potential issues. For instance, the current operations data may be analyzed continuously or near-continuously to quickly detect any anomalies or potential issues with an ATM.

Upon detection of an issue, the ATM operations control computing platform 110 may retrieve additional data related to the ATM at which the issue was detected. For instance, the ATM operations control computing platform 110 may retrieve additional data related to the hardware and/or software impacted, a type of issue detected, and the like. Based on this data, the ATM operations control computing platform 110 may identify a second generative AI model, from a plurality of generative AI models, associated with the identified type of issue. Each AI model of the plurality of AI models may be associated with a different type of issue, different component of the ATM, or the like, such that the models are trained using historical data specific to that issue or component. Accordingly, the arrangement may reduce computing resources needed to evaluate issues detected by executed a single, more focused model to address a detected issue.

The additional data and other data related to the ATM at which the issue was detected may be input to the selected second generative AI model to identify a cause of the issue and/or a corrective action to remedy the issue. The generated corrective action may be transmitted to the ATM at which the issue was detected, and any other ATMs at which a similar issue has occurred or may occur (e.g., based on evaluation of ATM operations data by the first generative AI model) and executed by the ATM to remedy the issue. The first and second generative AI models may then be updated and/or validated based on the generated outputs.

Internal entity computing system 120 may be or include one or more computing devices (e.g., servers, server blades, or the like) and/or one or more computing components (e.g., memory, processor, and the like) and may be configured to host or execute one or more enterprise organization applications, systems or the like. For instance, internal entity computing system 120 may host applications associated with processing transactions, authenticating a user, providing access to user data, updating or modifying an account ledger based on executed transactions, and the like.

ATM 150 and/or ATM 155 may be or include one or more computing or devices (e.g., servers, server blades, or the like) and/or one or more computing components (e.g., memory, processor, and the like) and may be configured to provide various functionality to user (e.g., deposits, withdrawals, balance inquiries, and the like), store and dispense funds, communicate with other systems or devices, such as internal entity computing system 120, to process transactions, and the like.

As mentioned above, computing environment 100 also may include one or more networks, which may interconnect one or more of ATM operations control computing platform 110, internal entity computing system 120, ATM 150 and/or ATM 155. For example, computing environment 100 may include network 190. Network 190 may include one or more sub-networks (e.g., Local Area Networks (LANs), Wide Area Networks (WANs), or the like). Network 190 may be associated with a particular organization (e.g., a corporation, financial institution, educational institution, governmental institution, or the like) and may interconnect one or more computing devices associated with the organization. For example, ATM operations control computing platform 110, internal entity computing system 120, ATM 150 and/or ATM 155 may be associated with an enterprise organization (e.g., a financial institution), and network 190 may be associated with and/or operated by the organization, and may include one or more networks (e.g., LANs, WANs, virtual private networks (VPNs), or the like) that interconnect ATM operations control computing platform 110, internal entity computing system 120, ATM 150 and/or ATM 155 and one or more other computing devices and/or computer systems that are used by, operated by, and/or otherwise associated with the organization.

Referring to FIG. 1B, ATM operations control computing platform 110 may include one or more processors 111, memory 112, and communication interface 113. A data bus may interconnect processor(s) 111, memory 112, and communication interface 113. Communication interface 113 may be a network interface configured to support communication between ATM operations control computing platform 110 and one or more networks (e.g., network 190, or the like). Memory 112 may include one or more program modules having instructions that when executed by processor(s) 111 cause ATM operations control computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of ATM operations control computing platform 110 and/or by different computing devices that may form and/or otherwise make up ATM operations control computing platform 110.

For example, memory 112 may have, store and/or include registration module **112*a*. Registration module 112*a* may store instructions and/or data that may cause or enable the ATM operations control computing platform 110** to receive registration data associated with one or more ATMs (e.g. ATMs within a network, ATMs associated with an enterprise organization, or the like). The registration may include a make, model number, location of deployment, and the like. This information may then be used in analyzing the ATM operations data to ensure proper functioning and/or identify any anomalies or potential issues.

ATM operations control computing platform 110 may further have, store and/or include ATM data module **112*b*. ATM data module 112*b* may store instructions and/or data to cause or enable the ATM operations control computing platform 110** to receive, from one or more ATMs (e.g., registered ATMs within the network, associated with the enterprise organization, or the like) current operations data. In some examples, the data may be received in real-time or near real-time. In some arrangements, the data may include data related to hardware components, software components or functions, and the like. For instance, data related to whether hardware components such as a card reader, deposit slot, withdrawal slot, keypad, display screen, headphone jack, or the like, may be received. Additionally or alternatively, data related to whether all functionality is available, whether user interfaces are properly displaying, whether user input is properly translated or mapped to functions, or the like. In some examples, data related to maintenance schedules or records, replenishment data, current funds availability, and the like, may be received. Additional ATM operations data may be received without departing from the invention.

ATM operations control computing platform 110 may further have, store and/or include generative artificial intelligence engine 112*c*. Generative AI engine 112*c* may host, train, execute, update and/or validate one or more generative AI models that may receive inputs such as current ATM operations data, detected anomalies or potential issues, data related to potential issues or anomalies, and the like and, upon execution of the one or more models, may output detection of an anomaly or potential issue, corrective action to remedy the potential issue, and the like. In some examples, generative AI engine 112*c* may host, train, execute, validate and/or update a plurality of nested generative AI models, wherein each model of the nested generative AI models may correspond to a different type of functionality or component of the ATM (e.g., deposits, transfers, external hardware, internal hardware, or the like), one or more issues associated with ATMs (e.g., unavailability of one or more functions, improper display of user interfaces, lack of funds, or the like), overall evaluation of the ATM data, and the like. The use of nested models may reduce processing required to train, update, validate and/or execute models by isolating a nested model particular to a topic and executing, updating, or the like, that nested model, which may, e.g., be more manageable than updating a single model having all functionality.

The AI model(s) may be trained using previously captured and/or historical ATM data (e.g., historical data related to issues or anomalies, historical data related to corrective actions, or the like). In some examples, additional data, such as regulatory requirements, publicly available data, or the like, may be used to train the one or more AI models. For instance, the one or more AI models may be trained using historical functionality data (e.g., user interfaces presented, audio data presented, hardware functionality, and the like) to identify patterns, sequences and/or correlations, to generate, in real-time and based current ATM operations data, an anomaly or potential issue, as well as one or more corrective actions to remedy the anomaly or potential issue. For instance, foundational knowledge related to ATM, ATM processes and functionality, and the like, may be used in conjunction with generative aspects, to provide real-time, dynamic generation of identified issues and corrective actions, to efficiently identify and address any issues.

In some examples, the AI model may be or include generative adversarial networks, diffusion models, variational autoencoders, flow models, and the like. Various other models, such as one or more supervised learning models (e.g., decision trees, bagging, boosting, random forest, neural networks, linear regression, artificial neural networks, logical regression, support vector machines, and/or other models), unsupervised learning models (e.g., clustering, anomaly detection, artificial neural networks, and/or other models), knowledge graphs, simulated annealing algorithms, hybrid quantum computing models, and/or other models may be used without departing from the invention.

ATM operations control computing platform 110 may further have, store and/or include output generation module 112*d*. Output generation module 112*d* may store instructions and/or data that may cause or enable the ATM operations control computing platform 110 to receive an output from the one or more generative AI models and generate one or more of an instruction, command, notification, or the like. The output may include instructions to commands to execute an identified corrective action to remedy and identified issue. The outputs generated may be transmitted or sent to one or more ATMs (e.g., registered ATMs) for execution.

ATM operations control computing platform 110 may include database 112*e*. Database 112*e* may store data related to ATM registration data, anomalies detected, corrective actions implemented, and/or other data that enables performance of aspects described herein by the ATM operations control computing platform 110.

FIGS. 2A-2D depict one example illustrative event sequence for using generative artificial intelligence to control ATM functions in accordance with one or more aspects described herein. The events shown in the illustrative event sequence are merely one example sequence and additional events may be added, or events may be omitted, without departing from the invention. Further, one or more processes discussed with respect to FIGS. 2A-2D may be performed in real-time or near real-time.

Figure 2A:
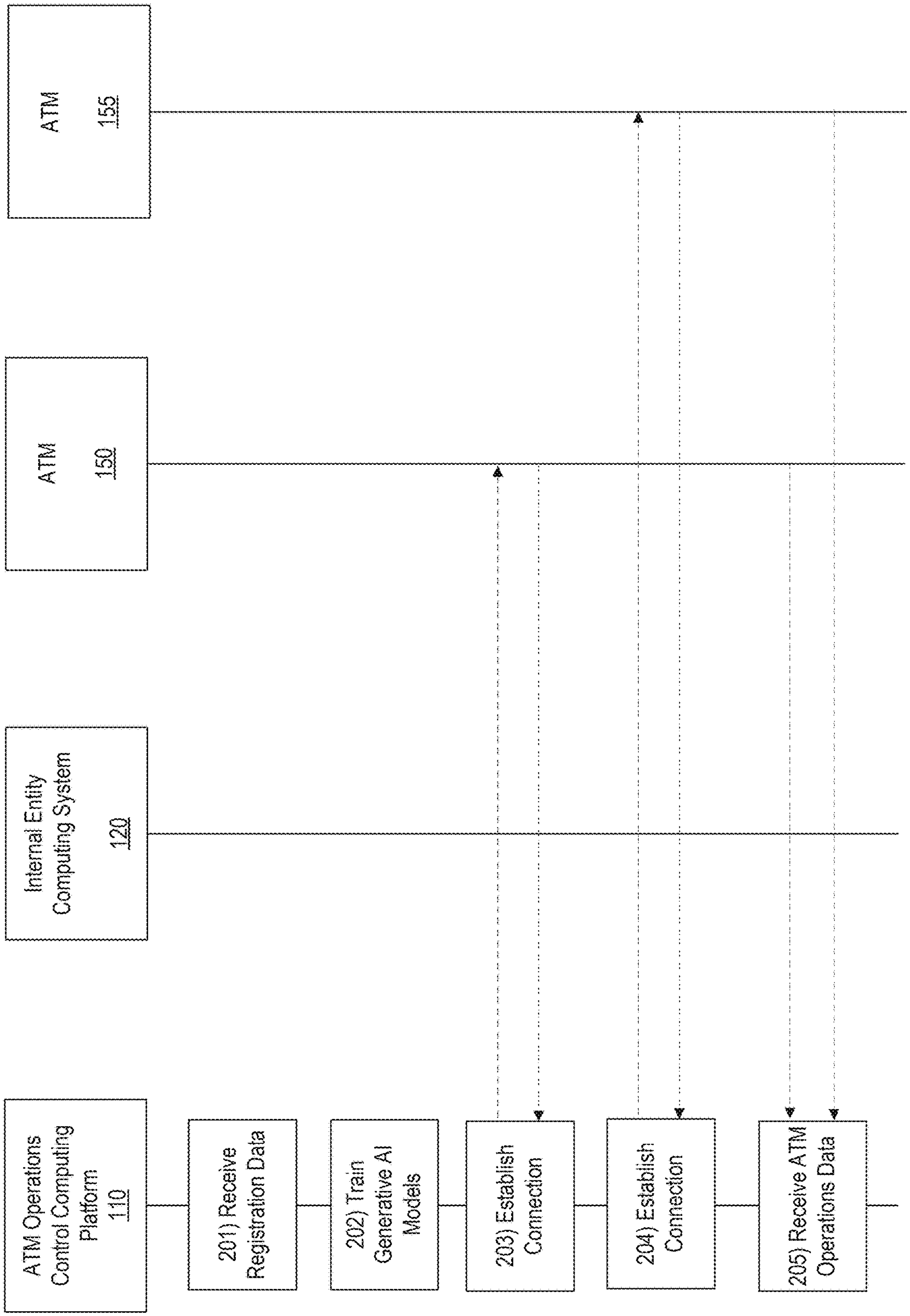
FIGS. 2A-2D depict an illustrative event sequence for using generative artificial intelligence models to control ATM operations in accordance with one or more aspects described herein.

With reference to FIG. 2A, at step 201, ATM operations control computing platform 110 may receive registration data. For instance, data associated with a plurality of ATMs may be received by ATM operations control computing platform 110 and stored in database 112*e*. The registration data may include a make or manufacturer of the ATM, model number, deployment location, unique identifier associated with the ATM, or the like.

At step 202, ATM operations control computing platform 110 may train one or more generative AI models. For instance, historical data related to ATM functionality, issues or anomalies in ATMs, corrective actions to address anomalies, and the like may be used to train a generative AI model to recognize patterns, sequences, correlations, and the like (e.g., structure-activity relationships) and generate content based on those recognized patterns, sequences or correlations. In some examples, ATM operations control computing platform may train one or more AI models to receive, as inputs, current ATM operations data (e.g., hardware functionality, software functionality, funds availability, maintenance records, and the like) to output one or more detected anomalies or potential issues with an ATM. In some examples, a first generative AI model may be trained to detect anomalies in current ATM operations data and a plurality of additional generative AI models may be trained to identify corrective actions, execute corrective actions, and the like.

For instance, a plurality of nested generative AI models may be generated. Each nested generative AI model may correspond to different functionality or components of an ATM (e.g., deposits, inquiries, card reader, storage cartridges, or the like), different issues or anomalies (e.g., shortage of funds, maintenance issues, improper display, or the like). Accordingly, the nested models may work alone or in conjunction with an additional AI model (e.g., foundational model such as the first generative AI model) to receive detected issue data, as well as additional data related to the issue and/or ATM impacted, and output a corrective action to remedy the issue.

At step 203, ATM operations control computing platform 110 may establish a connection with ATM 150. For instance, ATM operations control computing platform 110 may establish a first wireless connection with ATM 150. Upon establishing the first wireless connection, a communication session may be initiated between ATM operations control computing platform 110 and ATM 150.

At step 204, ATM operations control computing platform 110 may establish a connection with ATM 155. For instance, ATM operations control computing platform 110 may establish a second wireless connection with ATM 155. Upon establishing the second wireless connection, a communication session may be initiated between ATM operations control computing platform 110 and ATM 155.

Although two ATMs are shown, data from any number of ATMs may be received and analyzed without departing from the invention.

At step 205, the ATM operations control computing platform 110 may receive current operations data from ATM 150 and/or ATM 155. For instance, real-time or near real-time data related to the functionality of the ATM (e.g., availability of functions, availability of funds, or the like), operation of the ATM (e.g., hardware operations, software operations), maintenance, and the like, may be received.

Although two ATMs are shown, data from any number of ATMs may be received and analyzed without departing from the invention.

Figure 2B:
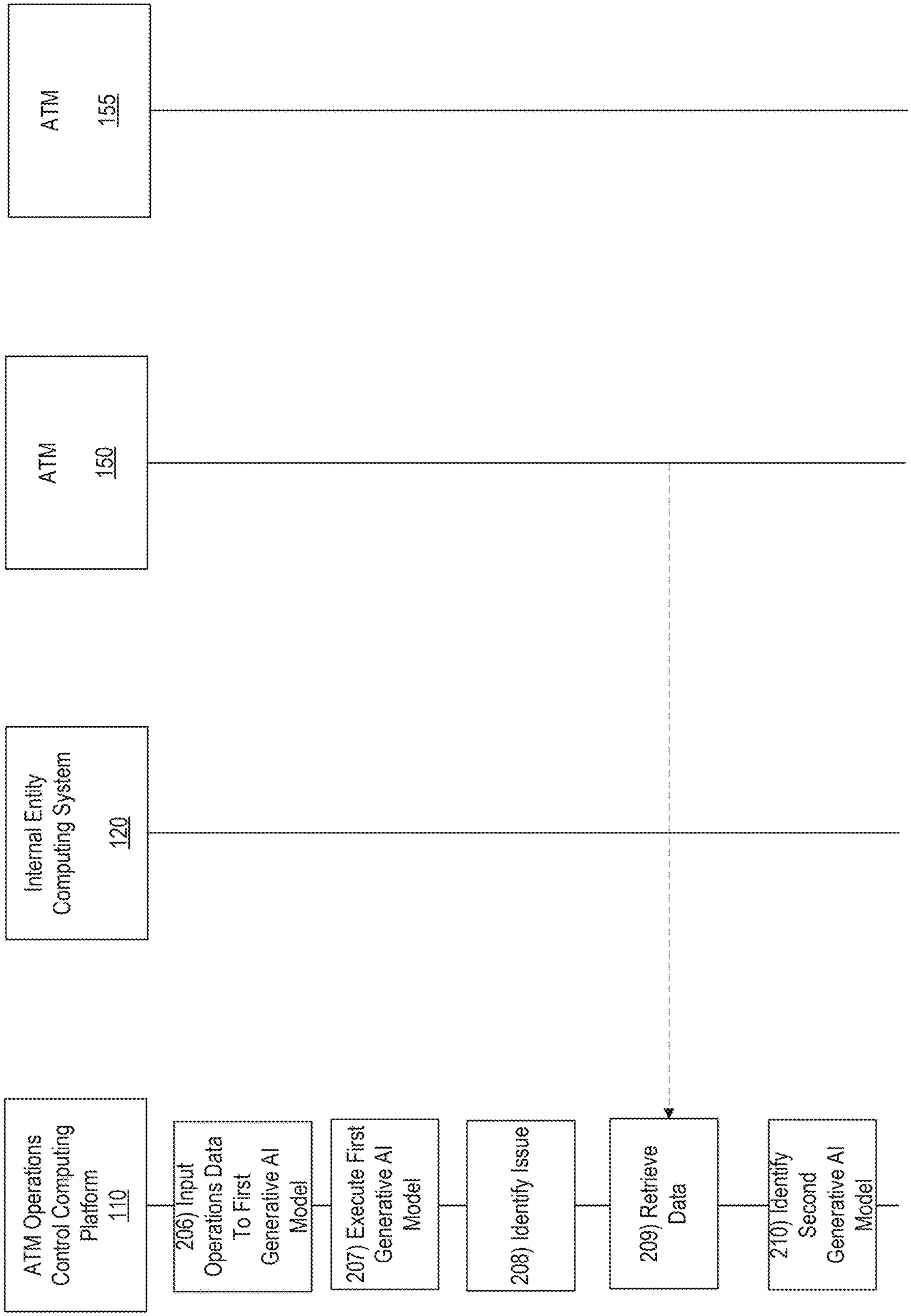

With reference to FIG. 2B, at step 206, the ATM operations control computing platform 110 may input the received current operations data from ATM 150 and/or ATM 155 to a first generative AI model. In some examples, the first generative AI model may be configured to evaluate ATM operations data to identify anomalies and/or potential issues in the data.

At step 207, the first generative AI model may be executed to analyze the received ATM data to determine whether any anomalies and/or potential issues are present in the data. Based on execution of the model, an issue may be identified at step 208. For instance, analysis of the current ATM data by the first generative AI model may output identification of an issue associated with one or more ATMs.

At step 209, based on the identified anomaly or issue, additional data related to the ATM impacted by the issue and/or the issue itself may be requested and received from the impacted ATM (e.g., ATM 150). The retrieved data may include additional details associated with the anomaly or issue (e.g., time of occurrence, additional processes executing at the time of occurrence, additional relevant operations data, and the like) and/or the ATM itself (e.g., maintenance records, scheduled maintenance, other operations issues, or the like).

At step 210, based on the identified issue and additional data, a second generative AI model may be identified. For instance, a second generative AI model may be identified from a plurality of additional nested AI models, each additional model corresponding to a particular feature, function, component, issue, or the like, associated with an ATM.

Figure 2C:
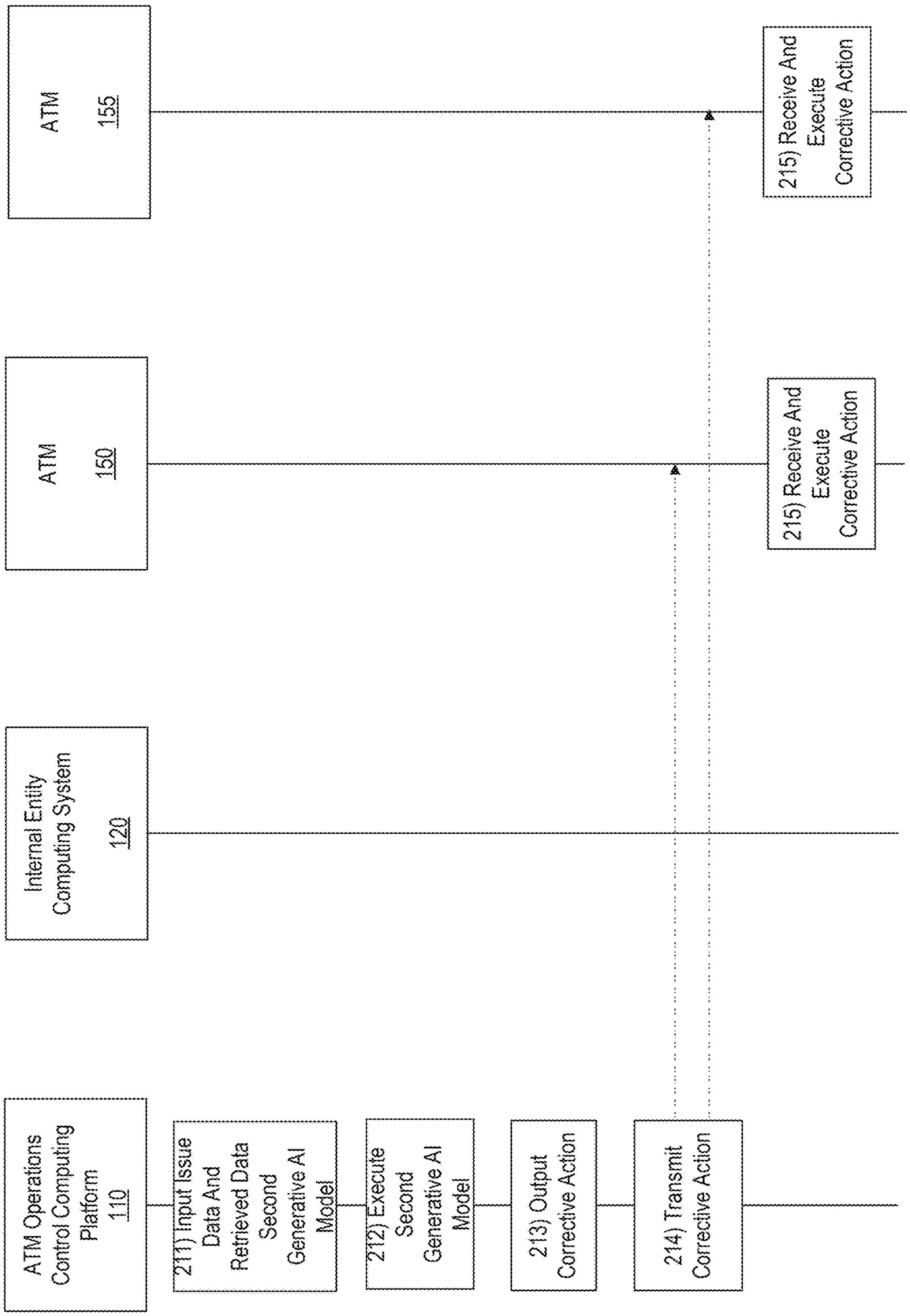

With reference to FIG. 2C, at step 211, the identified issue data, as well as the retrieved additional data may be input to the identified second generative AI model. At step 212, the second generative AI model may be executed to analyze the issue data and retrieved additional data.

At step 213, the second generative AI model may output, based on the analysis, a corrective action to remedy the identified issue.

At step 214, the corrective action may be transmitted to ATM 150 for execution to remedy the identified issue. In some examples, the corrective action may be output to one or more additional ATMs (e.g., ATM 155) that may be at risk for a same or similar issue, as determined by the second generative AI model.

At step 215, the corrective action may be received and executed by the ATM 150 and, in some examples, ATM 155.

Figure 2D:
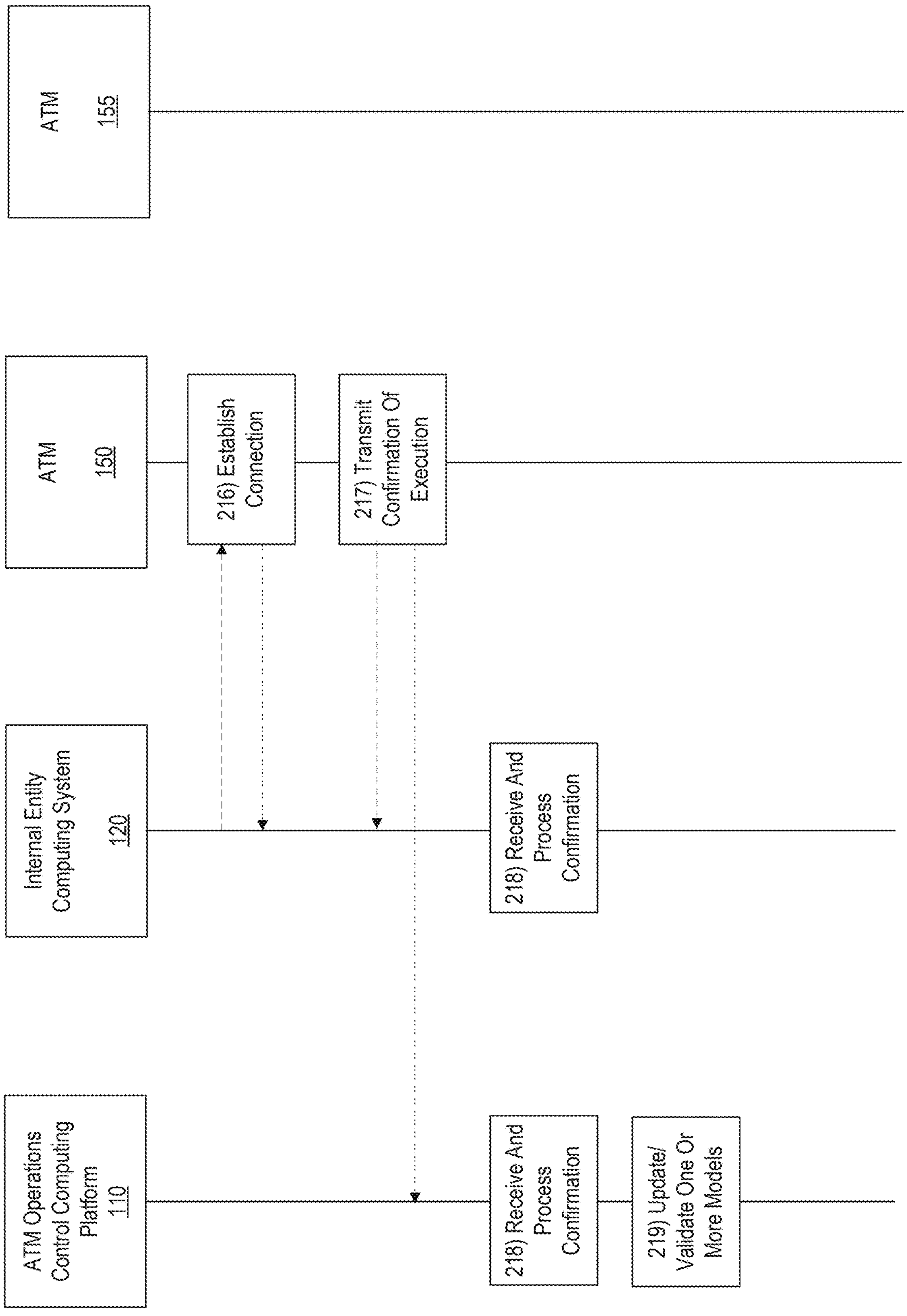

With reference to FIG. 2D, at step 216, ATM 150 may establish a connection with internal entity computing system 120. For instance, ATM 150 may establish a third wireless connection with internal entity computing system 120. Upon establishing the third wireless connection, a communication session may be initiated between ATM 150 and internal entity computing system 120.

At step 217, ATM 150 may transmit confirmation of execution of the corrective action to the ATM operations control computing platform 110 and/or the internal entity computing system 120. In some examples, the confirmation may include an indication of whether the execution of the corrective action remedied the issue.

At step 218, the ATM operations control computing platform 110 and/or the internal entity computing system 120 may receive and process the confirmation. For instance, internal entity computing system 120 may receive and process the confirmation to update a status of availability of functions of the ATM, process any outstanding transactions that may have been delayed due to the issue, or the like.

Further, ATM operations control computing platform 110 may process the confirmation and update the one or more generative AI models at step 219. For instance, the ATM operations control computing platform 110 may update, validate, re-train, or the like, the one or more generative AI models to improve accuracy of the models may be identified issues, executed corrective actions, and the like. In some examples, a dynamic feedback loop may be used to update the generative AI model(s). The feedback loop may be further monitored to identify an anomaly or detect unexpected performance.

Figure 3:
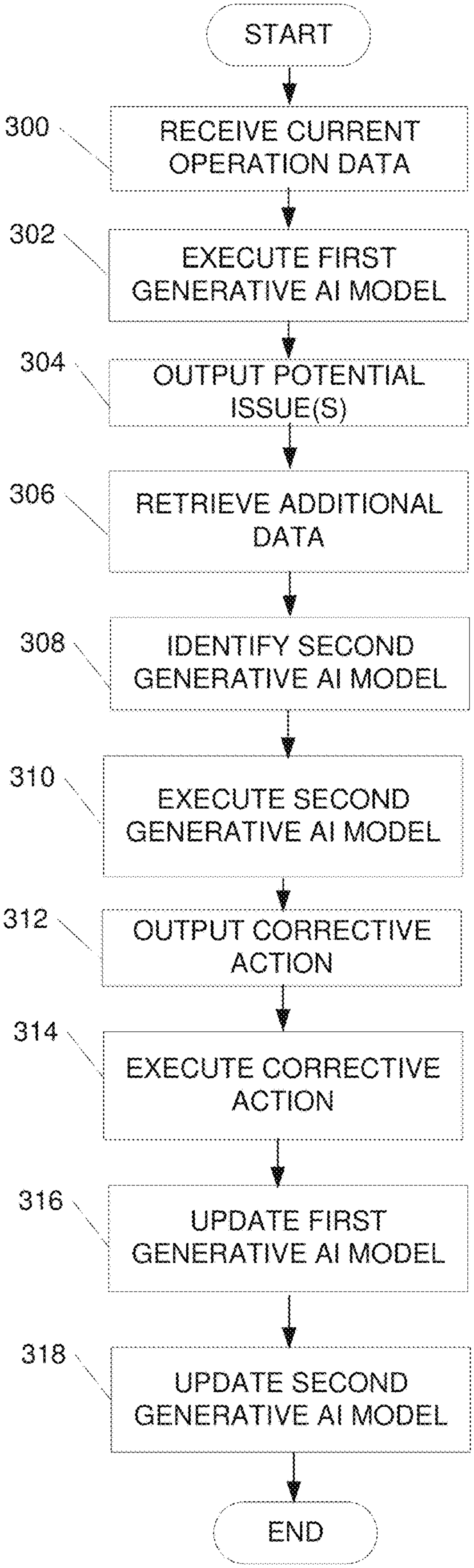
FIG. 3 depicts an illustrative method for using generative artificial intelligence models to control ATM operations in accordance with one or more aspects described herein.

FIG. 3 is a flow chart illustrating one example method of using generative artificial intelligence to control ATM operations in accordance with one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time.

At step 300, a computing platform, such as ATM operations control computing platform 110, may receive, operation data from a plurality of ATMs. For instance, the computing platform may receive current operation data from a plurality of ATMs in a network, associated with an enterprise organization, or the like. In some examples, the operation data may be received in real-time or near real-time. In some arrangements, the current operation data may include one or more of a maintenance record, hardware functionality data, software functionality data, funds availability data, or the like.

At step 302, the computing platform may execute a first generative artificial intelligence model. For instance, the current operation data received from the plurality of ATMs may be input to the first generative artificial intelligence model and, based on execution of the model, one or more anomalies or potential issues may be output at step 304. Each identified anomaly or potential issue may then be further analyzed.

At step 306, additional data related to a first potential issue output may be retrieved. For instance, the computing platform may retrieve, from an ATM, of the plurality of ATMs, at which the first potential issue was detected, additional data related to the issue (e.g., hardware impacted, software impacted, or the like).

At step 308, the computing platform may identify a second generative artificial intelligence model. For instance, based on a type of issue of the first potential issue, and the retrieved additional data related to the first potential issue, a second generative artificial intelligence model may be identified. In some examples, the second generative artificial intelligence model may be identified from a plurality of generative artificial intelligence models and each generative artificial intelligence model of the plurality of generative artificial intelligence models may be associated with a different type of issue.

At step 310, the computing platform may execute the second generative artificial intelligence model. For instance, the computing platform may input, to the second generative artificial intelligence model, the additional data related to the first issue and, upon execution of the model, a corrective action for the first potential issue may be output at step 312. In some examples, executing the second generative artificial intelligence model may further include outputting a cause of the first potential issue.

At step 314, the computing platform may execute the corrective action. For instance, the computing platform may generate and transmit, to the ATM at which the first potential issue was detected, an instruction or command causing modification of functionality or operation of the ATM. For instance, modifying functionality or operation of the ATM may include enabling or disabling functionality, updating software code (e.g., the second generative artificial intelligence model may generate software correct to address the first potential issue and may output the code as the corrective action), or the like. In some examples, executing the corrective action may further include updating a maintenance schedule (e.g., scheduling or rescheduling maintenance to address the first potential issue), causing replenishment of funds at the ATM, or the like.

At step 316, the computing platform may update the first generative artificial intelligence model. For instance, the first generative artificial intelligence model may be updated, validated and/or re-trained based on the analyzed first issue.

At step 318, the computing platform may update the second generative artificial intelligence model. For instance, the second generative artificial intelligence model may be updated, validated and/or re-trained based on the identified and/or executed corrective action.

Accordingly, as discussed herein, one or more generative artificial intelligence models may be used to monitor a network of ATMs, detect issues or potential issues, identify and execute corrective actions, and the like. The arrangements described herein may be used to respond to changes within the ATM or system itself, as well as other devices or systems impacted by the ATM.

Further, because the ATM system is constantly changing and has such a volume of parameters to be monitored, the generative aspect of the arrangements described here may not only ensure the system is in control of the ATM operations, but may also use statistical deviation to understand when changes to the model(s) are occurring and react to those changes.

In some examples, the generative AI model(s) may monitor one or more feedback loops to determine whether one or more components is missing, it not performing as expected, or the like. In some examples, feedback may be received not only via the system described but also by receiving outside data (e.g., vendor data indicating replenishment of an ATM, maintenance or service data, or the like). The models described herein may monitor all types of feedback to ensure corrective actions were performed or executed as expected, ensure the issue is resolved, and the like.

In some examples, the arrangements described herein may learn and/or create control parameters for components or parameters of an ATM system. This data may be used to further train, re-train, validate, update, or the like, the one or more models.

As described herein, the models discussed may analyze large amounts of data from a plurality of sources to identify a cause of an issue, as well as a corrective action to address the issue. In some examples, these functions may be performed more accurately than conventional systems and in real-time or near real-time, which might not be possible when relying on human intervention.

In some examples, the model(s) may self-regulate and/or may provide outputs that may indicate that the model may be trending in an unexpected direction or might require re-training.

As discussed herein, the arrangements may include a plurality of generative AI models where each model may be associated with a different type of issue. These arrangements may enable the system to suggest modifications or changes to ATM functions that may be authorized by human supervisors. In some examples, each generative AI model may become a subject matter expert in the particular issue associated with the corresponding model.

As discussed, the model(s) may be trained using historical operation or performance data. In some examples, data from external sources (e.g., vendors, publicly available data, regulatory requirements and the like) may be used to train the model(s).

In some arrangements, one or more models may queue operators or administrators to provide particular information related to an issue. For instance, if a knowledge gap exists in the model, the model may generate a query for a user to provide information to fill the knowledge gap that may be used to further train the model in order to enable the model to access the data at a next occurrence of the issue.

Further, while aspects described herein are described as using generative artificial intelligence, in some examples, machine learning, artificial general intelligence, or the like, may be used without departing from the invention.

One example implementation of the arrangements described herein is provided. The example provided is just one example implementation and other implementations may be used without departing from the invention.

In one example, a claim or notification may be received (e.g., from customer) that an ATM did not dispense a correct amount of funds. The model may analyze the data and identify a type of issue (e.g., mis-dispensing) and may evaluate current operation data of other ATMs to detect additional mis-dispensing issues. A second generative AI model associated with mis-dispensed funds may be identified and executed to evaluate a hardware database to determine whether a pattern of mis-dispensed funds has emerged. Further, the model may evaluate software management system to identify any patterns related to hardware and software with respect to mis-dispensed funds. In some examples, the model(s) may also look for potential fraud or other occurrences of unauthorized activity related to claims of mis-dispensed funds. The model may evaluate funds at the impacted ATM to ensure funds are balanced. The model may then identify a corrective action (e.g., dispense additional funds if customer still present, adjust a customer account ledger based on actual amount of funds dispensed, or the like) and may execute the corrective action at the ATM.

Figure 4:
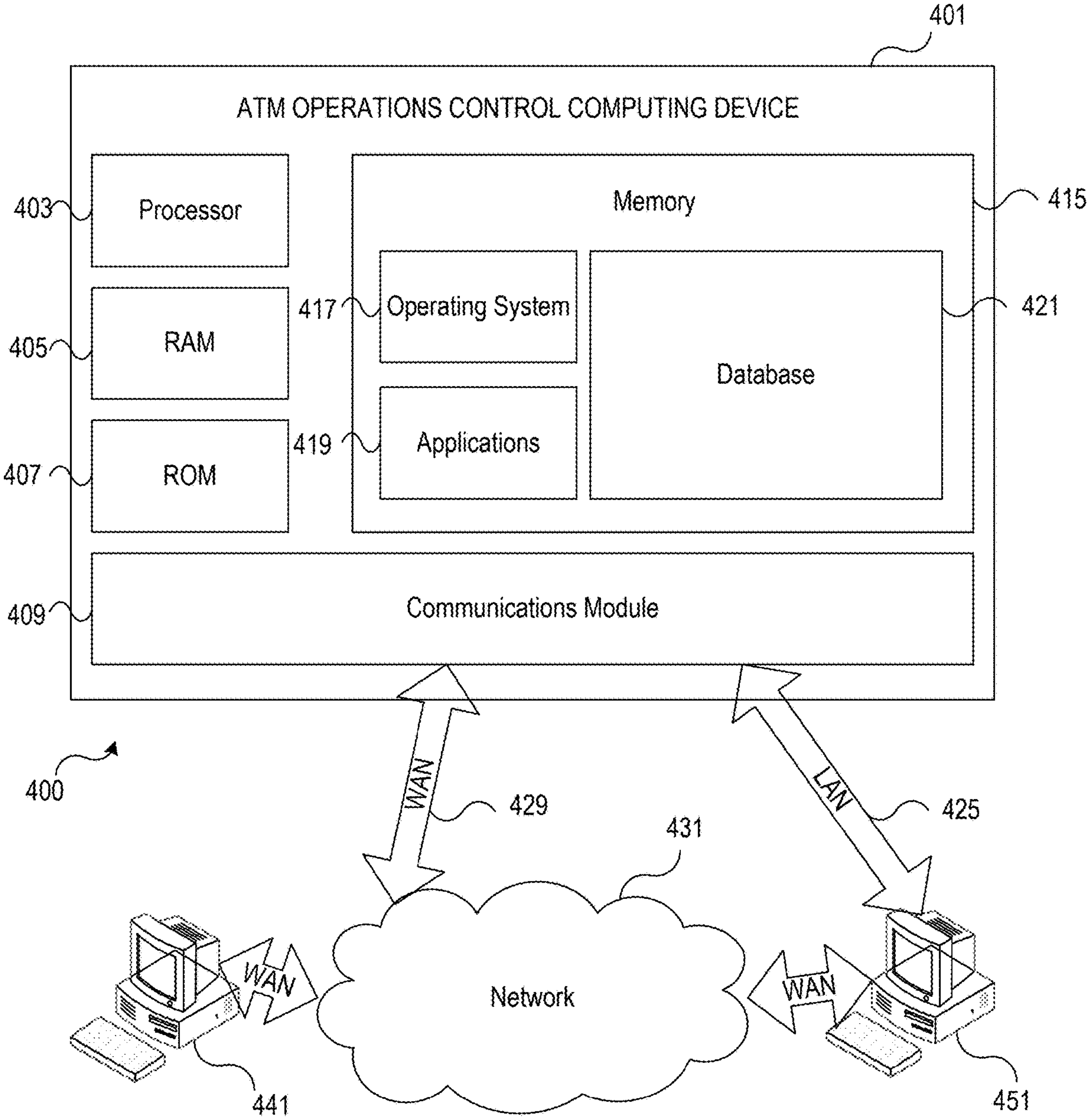
FIG. 4 illustrates one example environment in which various aspects of the disclosure may be implemented in accordance with one or more aspects described herein.

FIG. 4 depicts an illustrative operating environment in which various aspects of the present disclosure may be implemented in accordance with one or more example embodiments. Referring to FIG. 4, computing system environment 400 may be used according to one or more illustrative embodiments. Computing system environment 400 is only one example of a suitable computing environment and is not intended to suggest any limitation as to the scope of use or functionality contained in the disclosure. Computing system environment 400 should not be interpreted as having any dependency or requirement relating to any one or combination of components shown in illustrative computing system environment 400.

Computing system environment 400 may include ATM operations control computing device 401 having processor 403 for controlling overall operation of ATM operations control computing device 401 and its associated components, including Random Access Memory (RAM) 405, Read-Only Memory (ROM) 407, communications module 409, and memory 415. ATM operations control computing device 401 may include a variety of computer readable media. Computer readable media may be any available media that may be accessed by ATM operations control computing device 401, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by ATM operations control computing device 401.

Although not required, various aspects described herein may be embodied as a method, a data transfer system, or as a computer-readable medium storing computer-executable instructions. For example, a computer-readable medium storing instructions to cause a hardware processor to perform steps of a method in accordance with aspects of the disclosed embodiments is contemplated. For example, aspects of method steps disclosed herein may be executed on a processor on ATM operations control computing device 401. Such a processor may execute computer-executable instructions stored on a computer-readable medium.

Software may be stored within memory 415 and/or storage to provide instructions to processor 403 for enabling ATM operations control computing device 401 to perform various functions as discussed herein. For example, memory 415 may store software used by ATM operations control computing device 401, such as operating system 417, application programs 419, and associated database 421. Also, some or all of the computer executable instructions for ATM operations control computing device 401 may be embodied in hardware or firmware. Although not shown, RAM 405 may include one or more applications representing the application data stored in RAM 405 while ATM operations control computing device 401 is on and corresponding software applications (e.g., software tasks) are running on ATM operations control computing device 401.

Communications module 409 may include a microphone, keypad, touch screen, and/or stylus through which a user of ATM operations control computing device 401 may provide input, and may also include one or more of a speaker for providing audio output and a video display device for providing textual, audiovisual and/or graphical output. Computing system environment 400 may also include optical scanners (not shown).

ATM operations control computing device 401 may operate in a networked environment supporting connections to one or more other computing devices, such as computing device 441 and 451. Computing devices 441 and 451 may be personal computing devices or servers that include any or all of the elements described above relative to ATM operations control computing device 401.

The network connections depicted in FIG. 4 may include Local Area Network (LAN) 425 and Wide Area Network (WAN) 429, as well as other networks. When used in a LAN networking environment, ATM operations control computing device 401 may be connected to LAN 425 through a network interface or adapter in communications module 409. When used in a WAN networking environment, ATM operations control computing device 401 may include a modem in communications module 409 or other means for establishing communications over WAN 429, such as network 431 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
at least one processor;
a communication interface communicatively coupled to the at least one processor; and
a memory storing computer-readable instructions that, when executed by the at least one processor, cause the computing platform to:
train, using historical data related to at least automated teller machine (ATM) functionality, issues and anomalies, a first generative artificial intelligence model to identify correlations in subsequent data and output potential issue content based on the identified correlations, wherein the first generative artificial intelligence model includes a generative adversarial network;
train, using historical data related to at least ATM corrective actions associated with a plurality of types of issues, a plurality of second generative artificial intelligence models to identify correlations in subsequent data and output corrective action content based on the identified correlations;
receive, from a plurality of ATMs, current operation data;
execute the first generative artificial intelligence model, wherein executing the first generative artificial intelligence model includes inputting the current operation data to the first generative artificial intelligence model to output one or more potential issues;
analyze the output one or more potential issues, wherein analyzing the one or more potential issues includes:
for a first issue of the one or more potential issues:
retrieve, from an ATM of the plurality of ATMs at which the first issue was detected, additional data related to the first issue;
identify, based on a type of issue of the first issue and the retrieved additional data related to the first issue, a second generative artificial intelligence model of the plurality of second generative artificial intelligence models, wherein the second generative artificial intelligence model is associated with the type of issue;
execute the second generative artificial intelligence model, wherein executing the second generative artificial intelligence model includes inputting the additional data related to the first issue to output a corrective action;
execute the corrective action, wherein executing the corrective action includes transmitting a command to the ATM to at least modify an operation;
update the first generative artificial intelligence model based on the analyzing the first issue; and
update the second generative artificial intelligence model based on the executed corrective action.

2. The computing platform of claim 1, wherein the current operation data includes one or more of: a maintenance record, current hardware functionality data, current software functionality data, or funds availability data.

3. The computing platform of claim 1, wherein the current operation data is received in real-time.

4. The computing platform of claim 1, wherein
for a second issue of the one or more potential issues:
retrieve, from an ATM of the plurality of ATMs at which the second issue was detected, additional data related to the second issue;
identify, based on a type of issue of the second issue and the retrieved additional data related to the second issue, another second generative artificial intelligence model of the plurality of second generative artificial intelligence models, wherein the other second generative artificial intelligence model is associated with the type of issue of the second issue, the other second generative artificial intelligence model being different from the second generative artificial intelligence model;

execute the other second generative artificial intelligence model, wherein executing the other second generative artificial intelligence model includes inputting the additional data related to the second issue to output a corrective action for the second issue;

execute the corrective action for the second issue, wherein executing the corrective action includes transmitting a command to the ATM at which the second issue was detected to at least modify an operation; and update the other second generative artificial intelligence model based on the executed corrective action for the second issue.

5. The computing platform of claim 1, wherein each second generative artificial intelligence model of the plurality of second generative artificial intelligence models is associated with a different type of issue.

6. The computing platform of claim 1, wherein executing the second generative artificial intelligence model further outputs a cause of the first issue.

7. The computing platform of claim 1, wherein modifying an operation of the ATM includes at least one of: enabling functionality or updating software code.

8. The computing platform of claim 1, wherein executing the corrective action further includes updating a maintenance schedule.

9. The computing platform of claim 1, wherein executing the corrective action further includes causing a replenishment of funds at the ATM.

10. A method, comprising:

training, by a computing platform, the computing platform having at least one processor and memory, and using historical data related to at least automated teller machine (ATM) functionality, issues and anomalies, a first generative artificial intelligence model to identify correlations in subsequent data and output potential issue content based on the identified correlations, wherein the first generative artificial intelligence model includes a generative adversarial network;

training, by the at least one processor and using historical data related to at least ATM corrective actions associated with a plurality of types of issues, a plurality of second generative artificial intelligence models to identify correlations in subsequent data and output corrective action content based on the identified correlations;

receiving, by the at least one processor, and from a plurality of ATMs, current operation data;

executing, by the at least one processor, the first generative artificial intelligence model, wherein executing the first generative artificial intelligence model includes inputting the current operation data to the first generative artificial intelligence model to output one or more potential issues;

analyzing, by the at least one processor, the output one or more potential issues, wherein analyzing the one or more potential issues includes:

for a first issue of the one or more potential issues:

retrieving, by the at least one processor and from an ATM of the plurality of ATMs at which the first issue was detected, additional data related to the first issue;

identifying, by the at least one processor and based on a type of issue of the first issue and the retrieved additional data related to the first issue, a second generative artificial intelligence of the plurality of second generative artificial intelligence models, wherein the second generative artificial intelligence model is model associated with the type of issue;

executing, by the at least one processor, the second generative artificial intelligence model, wherein executing the second generative artificial intelligence model includes inputting the additional data related to the first issue to output a corrective action;

executing, by the at least one processor, the corrective action, wherein executing the corrective action includes transmitting a command to the ATM to at least modify an operation;

updating, by the at least one processor, the first generative artificial intelligence model based on the analyzing the first issue; and updating, by the at least one processor, the second generative artificial intelligence model based on the executed corrective action.

11. The method of claim 10, wherein the current operation data includes one or more of: a maintenance record, current hardware functionality data, current software functionality data, or funds availability data.

12. The method of claim 10, wherein the current operation data is received in real-time.

13. The method of claim 10, wherein for a second issue of the one or more potential issues:

retrieving, by the at least one processor and from an ATM of the plurality of ATMs at which the second issue was detected, additional data related to the second issue;

identifying, by the at least one processor and based on a type of issue of the second issue and the retrieved additional data related to the second issue, another second generative artificial intelligence model of the plurality of second generative artificial intelligence models, wherein the other second generative artificial intelligence model is associated with the type of issue of the second issue, the third other second generative artificial intelligence model being different from the second generative artificial intelligence model;

executing, by the at least one processor, the other second generative artificial intelligence model, wherein executing the other second generative artificial intelligence model includes inputting the additional data related to the second issue to output a corrective action for the second issue;

executing, by the at least one processor, the corrective action for the second issue, wherein executing the corrective action includes transmitting a command to the ATM at which the second issue was detected to at least modify an operation; and updating, by the at least one processor, the other second generative artificial intelligence model based on the executed corrective action for the second issue.

14. The method of claim 10, wherein each generative artificial intelligence model of the plurality of generative artificial intelligence models is associated with a different type of issue.

15. The method of claim 10, wherein executing the second generative artificial intelligence model further outputs a cause of the first issue.

16. The method of claim 10, wherein modifying an operation of the ATM includes at least one of: enabling functionality or updating software code.

17. One or more non-transitory computer-readable media storing instructions that, when executed by a computing platform comprising at least one processor, memory, and a communication interface, cause the computing platform to:

train, using historical data related to at least automated teller machine (ATM) functionality, issues and anomalies, a first generative artificial intelligence model to identify correlations in subsequent data and output potential issue content based on the identified correlations, wherein the first generative artificial intelligence model includes a generative adversarial network;

train, using historical data related to at least ATM corrective actions associated with a plurality of types of issues, a plurality of second generative artificial intelligence models to identify correlations in subsequent data and output corrective action content based on the identified correlations;

receive, from a plurality of ATMs, current operation data;

execute the first generative artificial intelligence model, wherein executing the first generative artificial intelligence model includes inputting the current operation data to the first generative artificial intelligence model to output one or more potential issues;

analyze the output one or more potential issues, wherein analyzing the one or more potential issues includes:

for a first issue of the one or more potential issues:

retrieve, from an ATM of the plurality of ATMs at which the first issue was detected, additional data related to the first issue;

identify, based on a type of issue of the first issue and the retrieved additional data related to the first issue, a second generative artificial intelligence model of the plurality of second generative artificial intelligence models, wherein the second generative artificial intelligence model is associated with the type of issue;

execute the second generative artificial intelligence model, wherein executing the second generative artificial intelligence model includes inputting the additional data related to the first issue to output a corrective action;

execute the corrective action, wherein executing the corrective action includes transmitting a command to the ATM to at least modify an operation;

update the first generative artificial intelligence model based on the analyzing the first issue; and update the second generative artificial intelligence model based on the executed corrective action.

18. The one or more non-transitory computer-readable media of claim 17, wherein each second generative artificial intelligence model of the plurality of second generative artificial intelligence models is associated with a different type of issue.

* * * * *